United States Patent
Fang

(10) Patent No.: US 7,697,173 B2
(45) Date of Patent: *Apr. 13, 2010

(54) TRANSPARENCY SCANNING MODULE

(76) Inventor: Po-Hua Fang, 3F, No.55, Aly.16, Ln.2, Kuang Fu St., YungHo City, Taipei (TW)

(*) Notice: Subject to any disclaimer, the term of this patent is extended or adjusted under 35 U.S.C. 154(b) by 647 days.

This patent is subject to a terminal disclaimer.

(21) Appl. No.: 11/485,656

(22) Filed: Jul. 12, 2006

(65) Prior Publication Data

US 2007/0035788 A1    Feb. 15, 2007

Related U.S. Application Data

(63) Continuation of application No. 09/921,729, filed on Aug. 3, 2001, now Pat. No. 7,092,131.

(51) Int. Cl.
*H04N 1/04* (2006.01)

(52) U.S. Cl. .............. 358/474; 358/487; 358/475; 358/509; 250/208.1; 250/234; 250/227.26; 399/380

(58) Field of Classification Search .............. 358/474, 358/487, 497, 486, 496, 475, 509, 506, 508, 358/494; 250/208.1, 234, 227.26; 399/380, 399/114; 359/212

See application file for complete search history.

(56) References Cited

U.S. PATENT DOCUMENTS

| | | | |
|---|---|---|---|
| 4,893,196 A | 1/1990 | Koshiyouji et al. | |
| 5,289,000 A * | 2/1994 | Toyofuku | 250/234 |
| 5,467,172 A | 11/1995 | Liao | |
| 5,781,311 A * | 7/1998 | Inoue et al. | 358/475 |
| 6,002,508 A * | 12/1999 | Mai | 359/212 |
| 6,163,385 A | 12/2000 | Kajander | |
| 6,185,011 B1 * | 2/2001 | William | 358/474 |
| 6,198,088 B1 * | 3/2001 | Seachman | 250/208.1 |
| 6,316,766 B1 | 11/2001 | Han | |
| 6,417,937 B1 | 7/2002 | Batten et al. | |
| 6,614,563 B1 * | 9/2003 | Batten et al. | 358/487 |
| 6,850,344 B2 * | 2/2005 | Chang | 358/487 |
| 7,092,131 B2 * | 8/2006 | Fang | 358/474 |
| 7,388,690 B2 * | 6/2008 | Thakur | 358/406 |
| 2002/0039205 A1 | 4/2002 | Chang | |
| 2002/0075517 A1 * | 6/2002 | Haining | 358/302 |
| 2005/0200917 A1 * | 9/2005 | Kanesaka et al. | 358/486 |
| 2006/0268365 A1 * | 11/2006 | Thakur | 358/474 |
| 2007/0058216 A1 * | 3/2007 | Chen et al. | 358/474 |

* cited by examiner

*Primary Examiner*—Negussie Worku
(74) *Attorney, Agent, or Firm*—Stolowitz Ford Cowger LLP

(57) ABSTRACT

The present invention is an improved transparency scanning module, which is applied on a cover of scanning device. The transparency scanning module and the cover can be taken apart for different consuming groups. The features of the invention are that transparency scanning module is embedded in cover, and a slot of cover for holding transparency scanning module is set plural fillisters, and there are plural connectors set on the relative positions of transparency scanning module for connecting each other. When the fillisters connecting with the connectors, transparency scanning module is able to offer light and also transparency scanning module and cover are combined and fixed each other closely; on the other hand, rim of transparency scanning module is thinner, and most central part is protruding in z direction, thus transparency scanning module can be inserted and held in the slot of cover. This is another design for closely combination.

15 Claims, 6 Drawing Sheets

TRANSPARENCY SCANNING MODULE

CROSS REFERENCE TO RELATED APPLICATIONS

This is a continuation patent application of U.S. patent application Ser. No. 09/921,729, filed Aug. 3, 2001, issued as U.S. Pat. No. 7,092,131.

FIELD OF THE INVENTION

The present invention is related to an improved transparency scanning module, especially a transparency scanning module applied on a document cover of a scanner.

BACKGROUND OF THE INVENTION

The present science has being developed to approach a better level than before, and this result comes from computer. For example, the connection and information transit among people, e-commerce on the net, etc., and all of them can not avoid the key of computer. Thus, electronic tools, merchandise, etc. are utilized at the present time. The first priority of modern personal electronic tools is mobile phone, then personal computer, portable computer, personal digital assistant, digital camera, digital camcorder, personal scanner, etc. Those are to offer medias for transferring human being normal and professional life to digital format, and it is easily saved for reference; or it can be sent to other people for their reference. Further benefit is that those electronic tools or merchandise can save both video and audio information, and it is really useful.

For the present digital camera and digital camcorder, prices are normally thousands to several decades thousands NTD (New Taiwan Dollars), and sometimes they cannot even reach the requirement what customers need. Therefore, those products are for player, and not for general people or amateurs. Meantime, there is another way to approach the requirement that digital camera and digital camcorder can do, which is to ask traditional and low cost scanner. Furthermore, both electronic file and traditional picture can be saved to be used in different conditions.

There are several kinds of transparency scanning module, such as UTA (Upper Transparency Adapter), UTC (Universal Transparency Cover), etc. In case of scanning transparent document, the universal transparency device is a need. If there is no interface for upper light plate on originally purchased scanner, the scanner cannot be utilized to transparent document, and only for general document. Please refer to FIG. 1, which shows a side view of application of universal transparency device in prior art, wherein there are a cover A and a scanning platform B, and an upper light device C is set within the cover A, and a light source D is in the upper light device C, thus upper light device C moves back and forth in cover A; an optical module E is set in the scanning platform B. Therefore, only purchasing transmission upper light source device, the transparent can be made.

Another prior art which is UTC referring to FIG. 2, and the FIG. 2 shows a scheme of built-in universal transparency device in prior art. The device also includes a cover device F and a scanning platform I. A built-in upper light plate G is set in the cover device F, both sides of the upper light plate are separately set two light sources H; Same as the above scanning platform B, the scanning platform I is installed an optical module J. The mentioned UTC is a built-in type. Namely, user should purchase additional upper light plate device to scan transparent document.

To know from above mentioning, transparency scanning module and cover are in one body and cannot be separated, thus both of them should be purchased together. This kind of consumption is not suitable for that the consumer does not need the transparency scanning module, the customer who considers financial point, then, the product acceptance and competitiveness are also effected. On the other hand, if market does not need such designed product, continuously manufacturing it is to increase cost, and the economical benefit is low.

SUMMARY OF THE INVENTION

The first object for the present invention is to save unnecessary expense. Because of separately designing and producing transparency scanning module and cover, consumer can only buy transparency scanning module or cover. After sorting markets and consumers, both consumers and manufacturers save costs.

The second object for the present invention is to offer a multiple application style. If both are purchased by consumer, the combination function for both can be applied when scanning transparent document; if there is a general document to be scanned, the transparency scanning module can be taken off from scanning platform and to install a general cover on the scanning platform; thus, the operation is lighter and more convenient.

The third object for the present invention is to save manufacturing cost. Because of investigating and sorting markets and consumers, manufacturers understand what the situation is, thus, different special products are produced based on different special consumer groups. This is to result of no additional products in stock.

The fourth object for the present invention is to promote competition. In case of no other manufacturers supplying such consuming style, the manufacturer who designs the different consumption method than any others before, consumers should put the manufacturer into the first priority for their purchasing.

For further understanding the present invention, please refer to the following figures and description.

DETAILED DESCRIPTION OF THE PREFERRED EMBODIMENT

Figure 1:
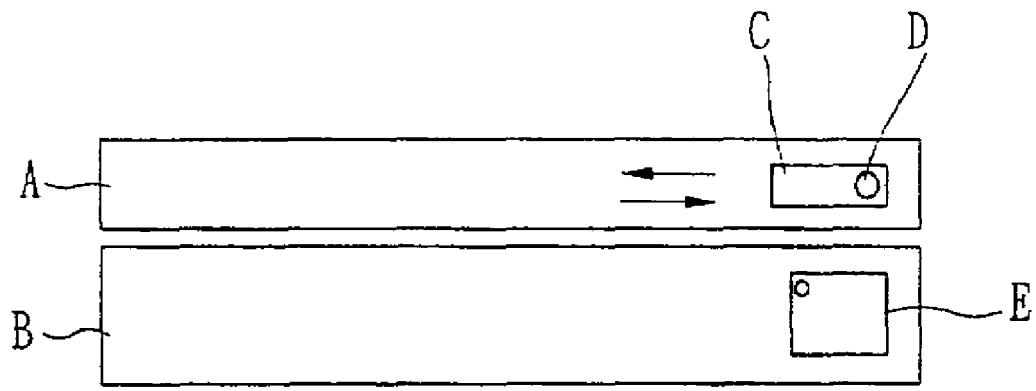
FIG. 1 is the side view scheme of application of transmission universal transparency device of the invention in prior art.
Figure 2:
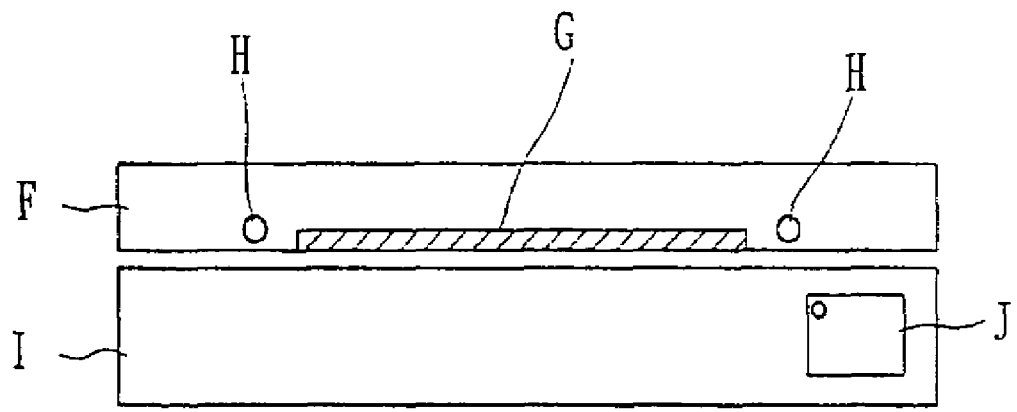
FIG. 2 is the scheme of built-in transmission universal transparency device of the invention in prior art.
Figure 3:
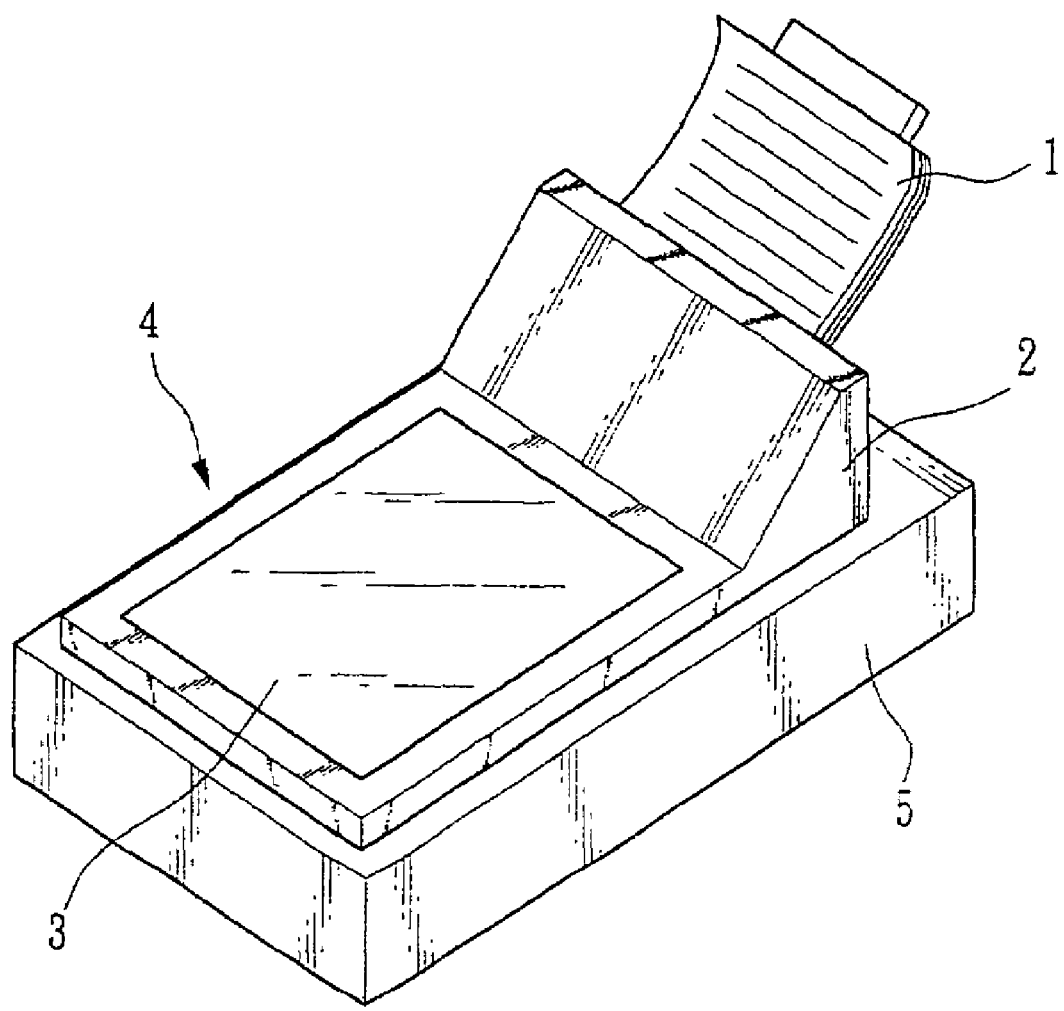
FIG. 3 is the scheme of the body of transparency scanning module, cover and ADF (Automatic Document Feeder) of the invention.
Figure 4:
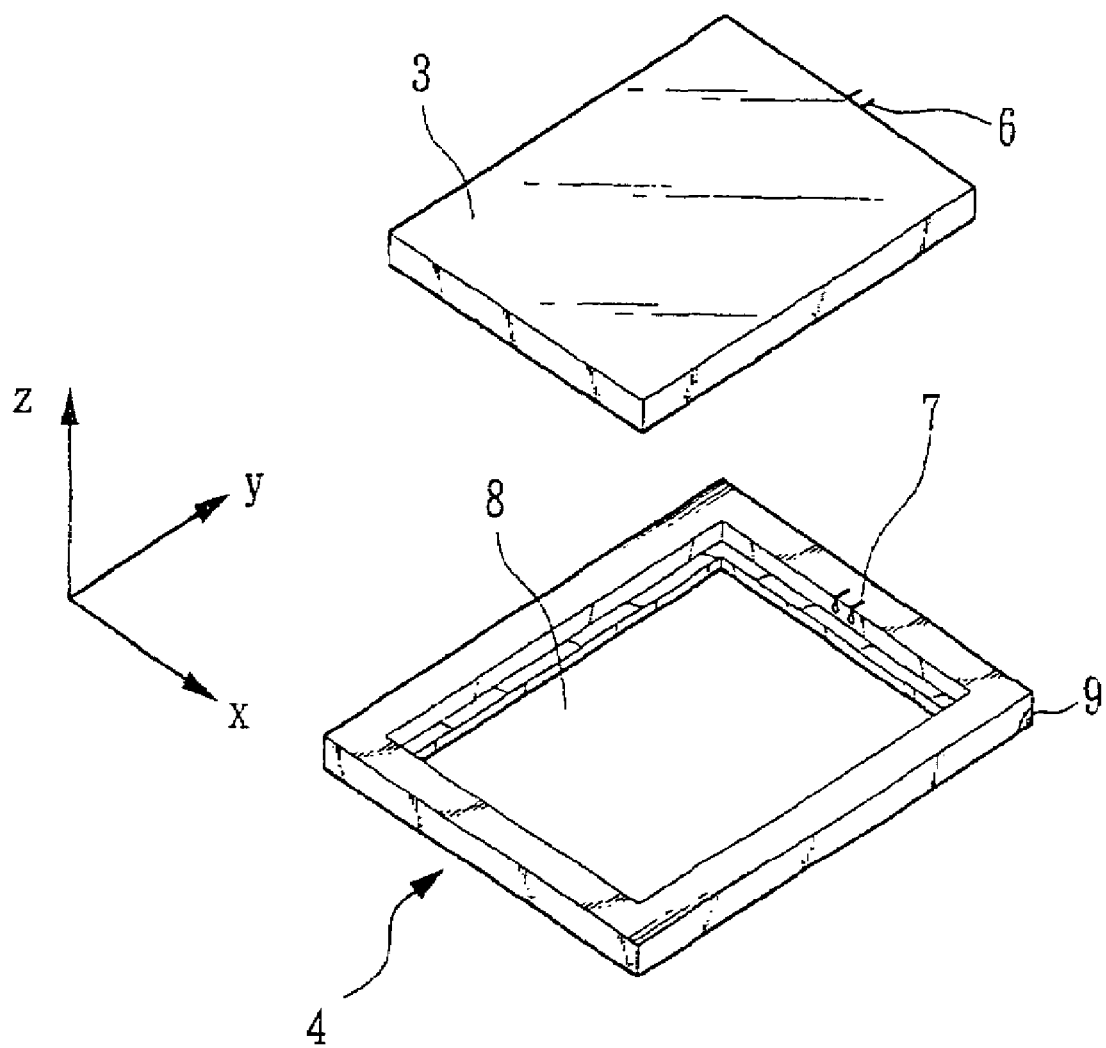
FIG. 4 is the 3-D scheme of the invention.

Please refer to FIG. 3, which is the combination scheme of transparency scanning module, cover and automatic document feeder. It shows that an automatic document feeder 2 is installed on a scanner 5, and paper 1 is transferred and fixed on a position of the scanner 5 for scanning via automatic document feeder 2, where is below the cover 4. In this case, transparency 3 offers light source for transparent document. FIG. 3 clearly and easily shows the combination application of automatic document feeder and transparency scanning module. Automatic document feeder 2, transparency scanning module 3 and cover 4 are embedded and cannot be taken apart. Please refer to FIG. 4, which is a 3-D scheme. The difference between FIG. 3 and FIG. 4 is that this embodiment ignores automatic document feeder 2 and is applied on cover of scanning mechanism (as general scanners); the transparency scanning module 3 is installed in the cover 4, and the features are:

The transparency scanning module 3 is embedded in the cover 4, and there are two fillisters 7 of a slot 8. The slot 8 is for transparency scanning module 3 putting into. The two fillisters 7 are in an inner wall of slot 8; on the contrary positions of transparency scanning module 3 are another two connectors 6 for connecting two fillisters 7. The two fillisters 7 on cover 4 and the two connectors 6 on transparency scanning module 3 can be connected and taken apart at any time. The central parts of the two fillisters 7 are made to be close together for embedding and holding two connectors 6. When the connection of two fillisters 7 and two connectors 6 are made, light source is ready for scanning transparent document. Another point, because of two fillisters 7 embedding two connectors 6 and transparency scanning module 3 matching into cover 4, the functions of fixing and combining for transparency scanning module 3 and cover 4 are approached. Therefore, transparency scanning module 3 and cover 4 cannot not be moved in any direction. On the other hand, a male pivot structure 9 is set at bottom of front end of cover 4, and there is another female pivot structure 9 is set at the position of scanner relative to the position of the male pivot structure 9, thus the open and close actions can be made for cover 4.

Figure 5:
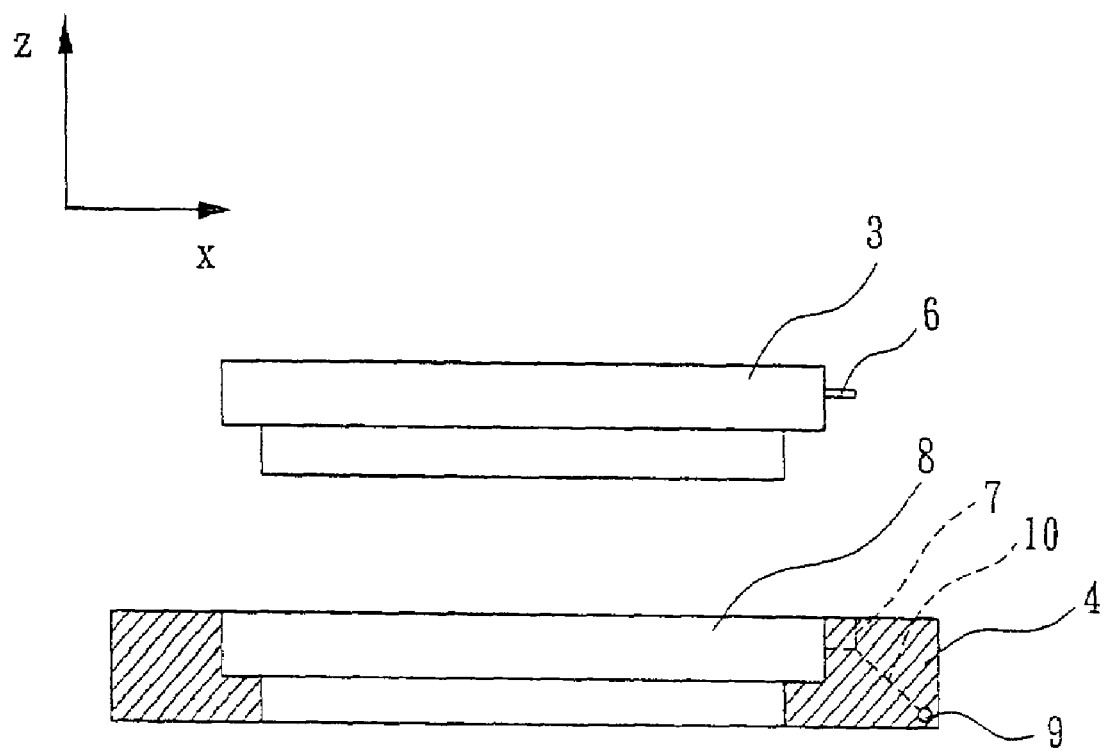
FIG. 5 is the section view of the invention.

Please refer to FIG. 5, which is the section view of the present invention, which shows the relationship of transparency scanning module 3 and the design of light source layout. The transparency scanning module 3 is protruding at most central part in z direction, and the rim is thinner; on the contrary, cover 4 is formed as a hollow at central part, and the form is matched with transparency scanning module 3. Thus, module 3 cannot be moved both at x and y directions. The combinations of afore said fillisters 7 with connectors 6 and the present transparency scanning module 3 with cover 4 make double fixing function. There is a light source line 10 designed at the connection of fillisters 7 and cover 4, then the line 10 goes to pivot structure 9, wherein line 10 can be formed to reach the object of convenience of pivot structure 9 rotation.

Figure 6:
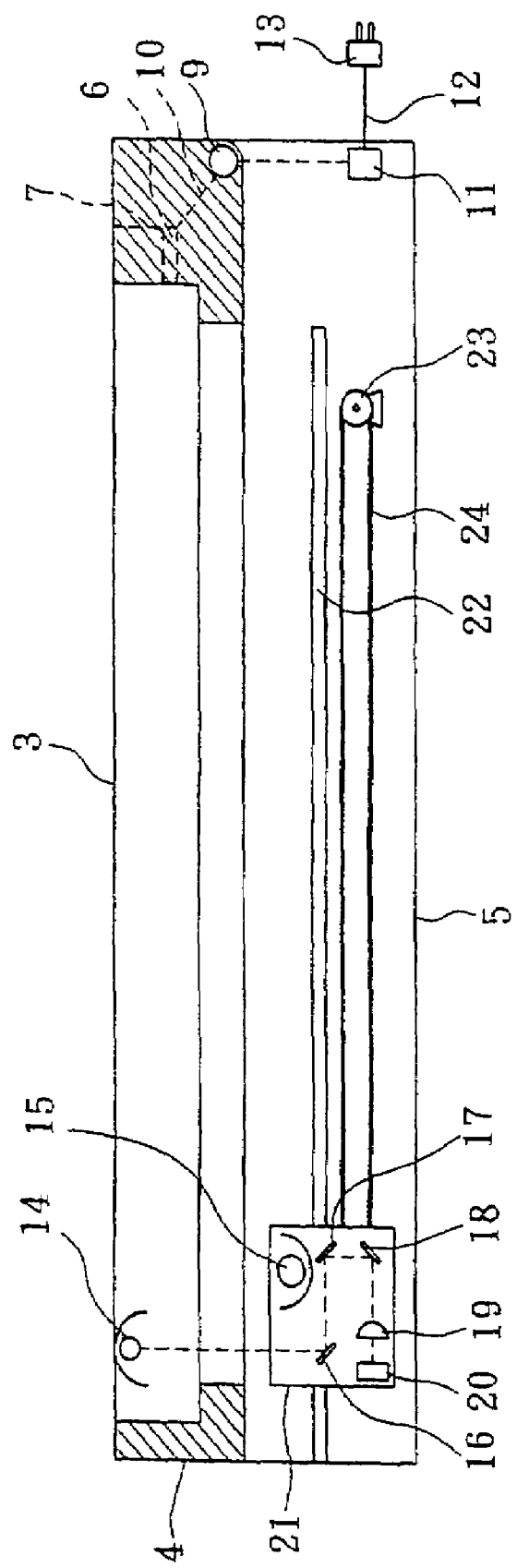
FIG. 6 is the scheme of preferred embodiment of whole body for the invention.

Please refer to FIG. 6, which is a preferred embodiment of the present invention. The embodiment is integrated to be described for prior art and the present invention. A transparency scanning module 3 is embedded with a cover 4. There is an upper light source 14 in the transparency scanning module 3 to supply a light going through transparent document (not shown in figure). After light going through transparent document, then light goes to a first reflect mirror 16, a second reflect mirror 17, a third reflect mirror 18 and a lens 19, finally emitting on a CCD 20 (Charge Couple Device). The afford said first reflect mirror 16, second reflect mirror 17, third reflect mirror 18, lens 19 and CCD 20 are all in a light-path device 21. The light-path device 21 is installed on a guide rod 22 and guided by the guide rod 22. A motor 23 drives light-path device 21 via a belt 24 to make the device 21 moving back and forth. A lower light source 15 emitting light path is prior art, and it is for general document and not described any more hereinafter. The section of light source line 10 after pivot structure 9 connects to an adapter 11 in a scanner 5, and then to a out line 12 and a plug 13, therefore, the layout is offer the power of upper light source 14. For the power layout of the lower light source 15 and motor 23 is prior art, and it is not described any more hereinafter.

Figure 7:
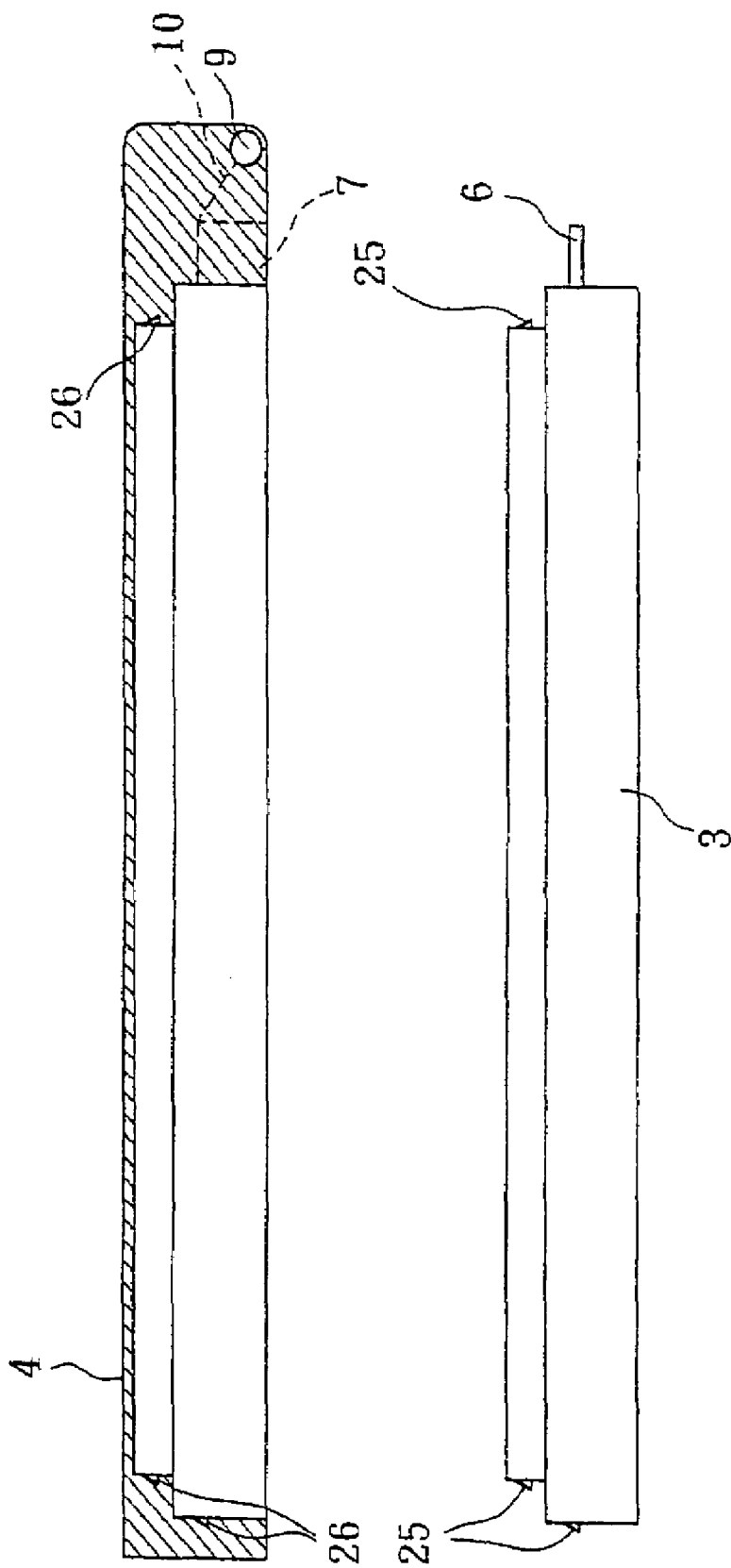
FIG. 7 is the scheme of another preferred embodiment of the invention.

Please refer to FIG. 7, which is a preferred embodiment of cover of the present invention. In FIG. 5, transparency scanning module 3 is embedded into cover 4 from top of cover 4; the present embodiment is from bottom of cover 4. The advantage is that there is no difference between transparency scanning module 3 and cover 4 in appearance. For the design of transparency scanning module 3, connectors 6 connect to fillisters 7 as same as afore said, and there are another three fasteners 25 connecting to another three fastening cavities 26 of cover 4 for strongly fixing and connecting.

As a conclusion, the present invention jumps out from the prior art, and gets rid of shortness of prior art to keep the necessary elements, thus not only the entity is lighter, but also that the cost is going down. The present is completely matching the present requirement of the scientific society.

The above descriptions are the preferable embodiments of the present invention. The covered scopes of the present invention are not restricted on the embodiments shown in the present invention. All the changes according to the contents of the present invention, such as: the change of shapes or locations of the arrangement of the fastening structures, etc., the generated functions and characteristics similar to those of the embodiments of the present invention and any ideas thought by the persons well-known such technologies are all within the scopes of the present invention.

What is claimed is:

1. A scanning module, comprising:
a body at least partially formed from transparent material;
a light source disposed within the body; and
a plurality of electrical connectors rigidly mounted on the body, wherein the plurality of electrical connectors are configured to provide electrical energy to the scanning module from a scanning device cover, wherein the scanning module is configured to releasably mount to the scanning device cover, and wherein an electrical connection between the plurality of electrical connectors and a plurality of corresponding scanning device cover electrical connectors is made when the scanning module is releasably snapped into place.

2. The scanning module of claim 1, wherein at least one of the plurality of electrical connectors is electrically coupled to the light source.

3. The scanning module of claim 1, further comprising a scanning module rim formed on at least a portion of the scanning module body, wherein the scanning module rim is configured to couple with a scanning device cover rim formed on the scanning device cover.

4. The scanning module of claim 1, wherein the light source is configured to supply light to at least a portion of the scanning module.

5. An apparatus, comprising:
means for releasably coupling a transparency module having an embedded light source and plural power connectors to a scanning device cover to enable transparent document scanning, wherein the transparency module contains a rigidly mounted electrical coupler, and wherein an electrical connection is made between the transparency module and the scanning device cover when the means for releasably coupling couples the transparency module with the scanning device cover.

6. The apparatus of claim 5, further comprising means for removing the transparency module to enable general document scanning.

7. The apparatus of claim 5, further comprising a rim formed on the transparency module, wherein the transparency module rim is configured to couple with a scanning device cover rim.

8. The apparatus of claim 5, wherein the embedded light source is configured to supply light to enable transparent document scanning.

9. A system, comprising:
a scanner device, having a scanner cover; and
a scanning module coupled to the scanner device cover, the scanning module comprising:
a body at least partially formed from transparent material;
a light source disposed within the body; and
a plurality of electrical connectors rigidly mounted on the body, wherein the plurality of electrical connectors are configured to provide electrical energy to the scanning module from the scanner device cover, wherein the scanning module is configured to releasably mount to the scanner device cover, and wherein an electrical connection between the plurality of electrical connectors and a plurality of corresponding scanner device cover electrical connectors is made when the scanning module is snapped into place.

10. The system of claim 9, wherein at least one of the plurality of electrical connectors is electrically coupled to the light source.

11. The system of claim 9, further comprising a scanning module rim formed on at least a portion of the scanning module body, wherein the scanning module rim is configured to couple with a scanning device cover rim formed on the scanning device cover.

12. A light panel comprising:
a body at least partially formed from translucent material;
a light source disposed within the body; and
a light panel electrical connector rigidly mounted to the body,
wherein the light panel releasably attaches to an imaging device cover, and
wherein an electrical connection between the light panel electrical connector and an imaging device cover electrical connector is made when the light panel is releasably attached to the imaging device cover, wherein the light panel releasably attaches to the imaging device cover via a light panel snap fit feature configured to releasably mate with a corresponding feature of the imaging device cover, and
wherein the electrical connection between the light panel electrical connector and the imaging device cover electrical connector is made when the light panel is snapped into place.

13. The light panel of claim 12, wherein the electrical connectors provide the snap fit feature.

14. An apparatus, comprising:
a cover containing a recessed portion, wherein the cover is pivotally attached to a scanner body;
a modular light source configured to be releasably mounted at least partially within the recessed portion of the cover, wherein electrical energy is supplied from the cover to the modular light source, wherein the modular light source includes an interference fit feature that interferes with a corresponding feature of the cover to releasably mount the modular light source to the cover; and
an electrical connector rigidly mounted to the modular light source, wherein an electrical connection between the modular light source electrical connector and a corresponding cover electrical connector is made when the modular light source is pressed into place thereby coupling the electrical connectors and providing electrical energy to the modular light source.

15. The light panel of claim 14, wherein the coupling electrical connectors provide the interference fit features.

* * * * *